(12) United States Patent
Palatnik de Sousa et al.

(10) Patent No.: US 12,518,097 B2
(45) Date of Patent: Jan. 6, 2026

(54) MASKED LANGUAGE MODEL AS A DEFENSE AGAINST TEXTUAL ADVERSARIAL ATTACKS

(71) Applicant: Dell Products L.P., Round Rock, TX (US)

(72) Inventors: Iam Palatnik de Sousa, Rio de Janeiro (BR); Karen Braga Enes, Belo Horizonte (BR); Karen Stéfany Martins, Belo Horizonte (BR); Pablo Nascimento da Silva, Niterói (BR)

(73) Assignee: Dell Products L.P., Round Rock, TX (US)

( * ) Notice: Subject to any disclaimer, the term of this patent is extended or adjusted under 35 U.S.C. 154(b) by 204 days.

(21) Appl. No.: 18/353,705

(22) Filed: Jul. 17, 2023

(65) Prior Publication Data
US 2025/0028904 A1     Jan. 23, 2025

(51) Int. Cl.
*G06F 40/284*     (2020.01)
*G06F 40/30*     (2020.01)

(52) U.S. Cl.
CPC .......... *G06F 40/284* (2020.01); *G06F 40/30* (2020.01)

(58) Field of Classification Search
CPC ............................. G06F 40/284; G06F 40/30
See application file for complete search history.

(56) References Cited

U.S. PATENT DOCUMENTS

| | | | |
|---|---|---|---|
| 10,956,477 B1 * | 3/2021 | Fang | G06F 40/30 |
| 2020/0104601 A1 * | 4/2020 | Karoui | H04N 23/6811 |
| 2024/0078320 A1 * | 3/2024 | Kim | G06F 21/577 |
| 2024/0242027 A1 * | 7/2024 | Kim | G06F 40/279 |

OTHER PUBLICATIONS

Zhang, X., Zhang, Z., Zhong, Q., Zheng, X., Zhang, Y., Hu, S., & Zhang, L. Y. (Jul. 2023). Masked Language Model Based Textual Adversarial Example Detection. In Proceedings of the 2023 ACM Asia Conference on Computer and Communications Security (pp. 925-937).*
Hugging Face Website, BERT Implementation, https://huggingface.co/, Nov. 28, 2022.
Wallace, et al., Universal Adversarial Triggers for Attacking and Analyzing NLP, arXiv preprint arXiv:1908.07125 (2021).
Liu, et al., Pre-train, Prompt, and Predict: A Systematic Survey of Prompting Methods in Natural Language Processing, arXiv preprint arXiv:2107.13586 (2021).

* cited by examiner

*Primary Examiner* — Bryan S Blankenagel
(74) *Attorney, Agent, or Firm* — Workman Nydegger

(57) ABSTRACT

One example method includes receiving a text string that includes multiple words, tokenizing the text string to create a tokenized text string, substituting each token in the tokenized text string with a mask token to create a masked text string, performing an inference process on the masked text string to obtain a respective probability for each token, determining a respective suspicion level for each probability, modulating the suspicion levels to obtain a respective weighted suspicion score for each token, and comparing each of the weighted suspicion scores with a threshold to determine whether any one or more of the words indicate that the text string includes an attack prompt.

18 Claims, 3 Drawing Sheets

MASKED LANGUAGE MODEL AS A DEFENSE AGAINST TEXTUAL ADVERSARIAL ATTACKS

FIELD OF THE INVENTION

Embodiments of the present invention generally relate to adversarial attacks in the context of machine learning models. More particularly, at least some embodiments of the invention relate to systems, hardware, software, computer-readable media, and methods, for using a masked language modeling approach against adversarial attacks on natural language processing models.

BACKGROUND

Adversarial attacks are a known vulnerability of Deep Neural Networks (DNN) such as natural language processors (NLP). Such attacks typically involve small perturbations applied to the inputs of a classifier, which can cause several undesirable effects.

A common goal of these attacks is to cause misclassification, so as to compromise the quality of the predictions made by the model. That is, an attack may cause the model to misclassify or misinterpret an input received by the model. In more serious threats, an adversary might also use these attacks to manipulate a model into making specific harmful decisions.

In the particular realm of NLP, adversarial attacks involve including particular strings such as words or letters of an input so as to trigger a specific behavior of the NLP model output, such as changing a predicted class, or making a text generation output biased/offensive content. In one typical type of attack, adversarial strings are appended either to the beginning or the ending of the input sentence that is provided to the NLP model.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
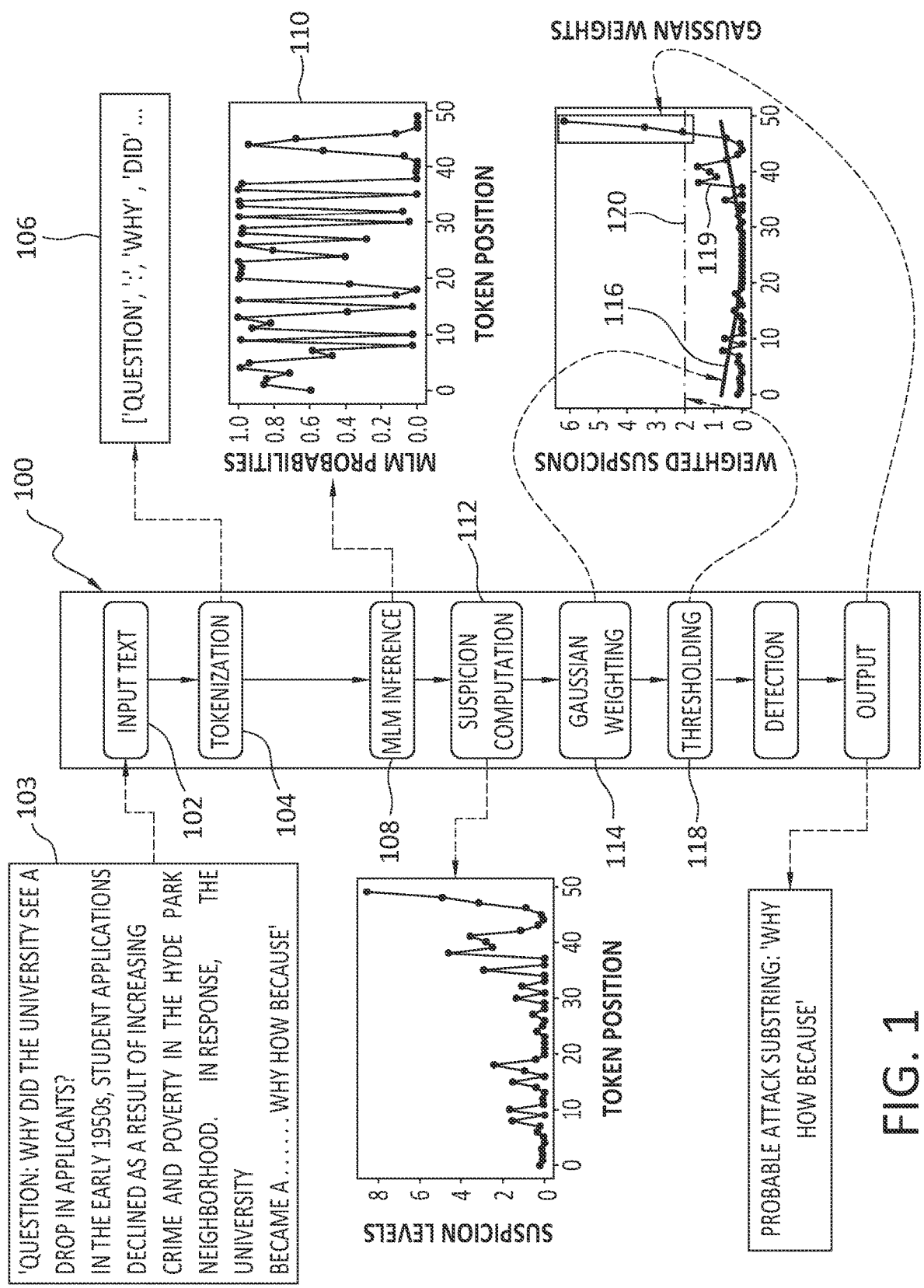
FIG. 1 discloses aspects of an example method according to one embodiment.

Embodiments of the present invention generally relate to adversarial attacks in the context of natural language processing models. More particularly, at least some embodiments of the invention relate to systems, hardware, software, computer-readable media, and methods, for using a masked language modeling approach against adversarial attacks on natural language processing models.

One example embodiment of the invention comprises a method, and module(s) for implementing the method. In this example embodiment, the method may comprise the following operations: receiving an input sentence for analysis; tokenize the input sentence using, for example, a pretrained MLM (masked language) model; iterating, over each token of the tokenized sentence, and substituting the token with a mask token; using the MLM model, performing an inferencing on the masked sentence, to obtain the respective probabilities P for each token; computing $-1*\log 10(P)$, or 'suspicion level,' for each token; modulating the suspicion levels with a Gaussian weight function—in an embodiment, this weight function leaves suspicion levels at the start and end of the sentence unchanged but lowers the respective suspicion levels of tokens located at or near the middle of the sentence; and, outputting respective final weighted suspicion scores for each token, and determining which, and/or. how many of those suspicion scores surpass a predefined threshold. Based on this determination, a decision may then be made as to whether or not the analyzed sentence is indicative of the occurrence of an attack on the NLP model, or otherwise presents a concern.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that the method can be applied to any pretrained MLM model, and does not require the creating or tuning of a specific model to detect attacks on NLP models. An embodiment may determine an extent to which a given token is suspicious, rather than being limited to a binary approach in which a token is classified as either suspicious or not. An embodiment may comprise an agnostic approach that is independent of the particular machine learning model used to perform NLP. Various other advantages of some example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Context for an Embodiment of the Invention

A.1 Language Models (LMs)

With the advent of transformer networks and newer, larger datasets, Natural Language Processing (NLP) has increasingly moved to a pre-training and fine-tuning paradigm. In this paradigm, a model is pre-trained as a language model (LM), predicting the probability of observed textual data, and learning general representation of the language. Generally, to be able to model the language, the LMs are trained using large datasets, which require huge computational power and may take months to train. Then, the pre-trained LM is adapted and fine-tuned to downstream tasks such as sentimental analysis, text summarization, and translation. Generally, a single model is adapted for each task, which requires large, annotated datasets.

LMs may have different training objectives. For instance, autoregressive models learn to predict the tokens in sequence, one at a time, typically left to right. Given, for example, the string "This is a good [ ]," the LM will predict the next word with highest probability, that is, the word most likely to follow the string, such as "day."

An LM may also have a denoising objective, where a noising function is applied to an input sentence, and then an attempt is made to predict the original input, given the noised text. One example of noising function, known as masking, replaces one, or multiple tokens, with a special token such as [MASK]. Table 1 below discloses examples of sentences to which masking, comprising a mask [Z], has been applied. One of the best-known models in the literature that uses a denoising pretraining objective is BERT (Bidirectional Encoder Representations from Transformers), as disclosed in "Liu, Pengfei, et al. *"Pre-train, prompt, and predict: A systematic survey of prompting methods in natural language processing."* arXiv preprint arXiv:2107.13586 (2021)" ("Liu"), which is incorporated herein in its entirety by this reference, and from which Table 1 is reproduced for illustrative purposes.

TABLE 1

| Operation | Element | Original Text | Corrupted Text |
|---|---|---|---|
| Mask | one token | Jane will move to New York. | Jane will [Z] to New York. |
|  | two tokens | Jane will move to New York. | Jane will [Z] [Z] New York. |
|  | one entity | Jane will move to New York. | Jane will move to [Z]. |

A.2 Sub-Word Tokenization

In general, a tokenizer splits an input string, such as a sentence or a portion of a sentence for example, into minimal semantically relevant parts referred to as 'tokens.' The particular tokenizer employed in a given situation may depend on the choice of NLP model, and the NLP task to be performed by the NLP model. One example embodiment of the invention employs an encoder type model for an MLM task. Typically, pretrained models come with their own specific tokenizers. For instance, BERT uses a sub-word tokenizer, which means that it divides a sentence into words and/or pieces of words. As an example, taking the tokenizer from the pretrained BERT implementation in the Hugging Face library, one may tokenize the hypothetical sentence "study OCTO-1234 was successfully finished" as: [<start>, 'study', 'oct', '##', '-', '123', '##4', 'was', 'su,' '##cc', '##es,' '##fully', 'finished',', <end>] . . .

where <start> and <end> are placeholder tokens that specify to BERT that the sentence has started and ended, respectively, and the rest of the tokens correspond to the words in the sentence.

In the foregoing example, it is noted that some words are tokenized as the whole word (such as 'study' and 'was'), while other words are split into sub-words (such as 'su,' '##cc,' '##es,' and '##fully') where the '##' characters indicate that a given token is a sub-word continuing from the previous sub-word. In general, sub-word tokenization may enable NLP models to overcome problems with tokens that are outside of the training vocabulary, and generalize their representations better.

A.3 Prompt-Based Learning

Recently, the pre-train and fine-tune paradigm has changed to "pre-train, prompt, and predict" and now some state-of-the-art methods are based on prompt-based learning. In this new paradigm, downstream tasks are reformulated to look like the task learned during the original LM training, as disclosed in "Wallace, E., Feng, S., Kandpal, N., Gardner, M. and Singh, S., 2019. *Universal adversarial triggers for attacking and analyzing NLP.* arXiv preprint arXiv:1908.07125" ("Wallace"), which is incorporated herein in its entirety by this reference. In order to do this, the text input is modified using prompts. This approach enables large LMs to generalize to tasks that the LM was not trained on, with minimal data and performance comparable to fine tuning. Unlike the last paradigm, a single pretrained model can be applied to different tasks, reducing computational costs.

Prompt learning can be implemented in three stages. The first stage, sometimes referred to as 'prompt engineering' applies a function to modify the original input, which uses a template with two empty slots, namely, an input slot [x] and an answer slot [z]. The input slot [x] is filled with the original input. For instance, considering a sentiment analysis task as an illustration, given the template "[X] The movie is [Z]" and the input "I love this movie" inserted into the input slot [x], the result or output will be "I love this movie. The movie is [Z]."

In the second stage of prompt learning, that is, the answer search stage, a set 'Z' of permissible answers may be defined. Continuing with the sentiment analysis example introduced above, a set may be defined as Z={'great,' 'fantastic', 'bad' . . . }. Then, a search may be performed over Z, looking for the highest scoring text that maximizes the score of the pretrained LM.

Finally, in the third stage of prompt learning, that is, the answer mapping stage, the highest scoring answer may be transformed to the highest scoring output. For example, and keeping in mind that a sentiment analysis is being performed in this example, if the highest scoring answer for the input "I love this movie" is "great," the final output would be "positive" instead of "negative." Note that prompts can be manually created based on human introspection or automatically generated. Typically, prompts have comparable performance, at the cost of interpretability and computational efforts. Table 2 (see Liu) is reproduced for illustrative purposes and discloses all three stages of this example of prompt learning.

TABLE 2

| Name | Notation | Example | Description |
| --- | --- | --- | --- |
| Input | x | I love this movie. | One or multiple texts |
| Output | y | ++(very positive) | Output label or text |
| Prompting Function | $f_{prompt}(x)$ | [X] Overall, it was a [Z] movie. | A function that converts the input into a specific form by inserting the input x and adding a slot [Z] where answer z may be filled later. |
| Prompt | x' | I love this movie. Overall, it was a [Z] movie. | A text where [X] is instantiated by input x but answer slot [Z] is not. |
| Filled Prompt | $f_{fill}(x', z)$ | I love this movie. Overall, it was a bad movie. | A prompt where slot [Z] is filled with any answer. |
| Answered Prompt | $f_{fill}(x', z^*)$ | I love this movie. Overall, it was a good movie. | A prompt where slot [Z] is filled with a true answer. |
| Answer | z | "good", "fantastic", "boring" | A token, phrase, or sentence that fills [Z] |

A.4 Adversarial Attacks

The main goal behind adversarial attacks is to induce errors in machine learning (ML) models by modifying an input to the ML so that the output of the ML is compromised in some way. For example, a person can use an adversarial attack to introduce fake news in a way that it cannot be detected by fake news detectors. Thus, the output of the model may contain fake news presented as factual news. Depending upon the particular implementation of the attack, the input modification may be imperceptible to humans. For example, the input may be modified by the attacker in such a way that individual image pixels may be modified, but the overall shape and color of the image largely retained. As another example, a human could identify add some tokens, such as words for example, to a text input to an ML model.

In Wallace, the authors approach the problem of universal adversarial triggers, which are defined as "input-agnostic sequences of tokens that trigger a model to produce a specific prediction when concatenated to any input from a dataset." These triggers may be considered as a prompt added in the beginning or end of the input. Universal attacks are agnostic to the model architecture. Furthermore, Wallace states that the same triggers can be reused to attack any model trained with the same datasets and, to generate such an attack, proposes a guided search over tokens (words, sub-words, or characters), selecting the ones with higher likelihood of changing the model prediction when concatenated with any input. Since the tokens are generated randomly and can be sub-words or characters, generally they may not make semantical sense. As a result, the attacks can cause prediction errors for sentiment analysis, arbitrary target predictions for reading comprehension and/or generation of racist/prejudiced outputs for conditional text generation.

In light of the context presented here, an example embodiment is configured to address universal adversarial attacks. One particular embodiment comprises a model agnostic defense to prevent machine learning models from being deceived.

B. Overview of Aspects of an Example Embodiment

As noted earlier herein, an attacker may generate, or modify, input trigger strings to an NLP model. However, these trigger strings often include tokens/words that are not coherent with the rest of the sentence and, as a result of that lack of coherence, may be detected by using a separate detector model. As such, an embodiment may operate to identify attacks by detecting highly unlikely words given a context. In other words, an embodiment of the invention may operate to detect words that, according to a trained MLM, do not seem to belong to a string, either at the start or ending of a string, or both, in an automatic fashion. An embodiment may thus have a semantic understanding of the language, and task at hand. Thus, and more specifically, an embodiment may implement the following functionalities: [1] building an NLP language model defense against adversarial attacks using a limited number of computational resources; [2] identifying the suspicion level of each input token in an automatic fashion; and [3] building a defense for NLP models that can be applied to many distinct types of machine learning models.

Accordingly, an embodiment may comprise a model agnostic defense method that uses a language model pretrained on Masked-Language-Modelling (MLM), also known as Cloze task. Such models mask tokens in a sentence and then try to complete the masked position to recover the original sentence. As such, by using these models, it is possible to obtain the probability that each token in a sentence belongs to a specific position in the sentence.

By detecting words that have very low probability, that is, words that are extremely unlikely to belong in a given position in a input text string, an embodiment may flag certain sentences as being potentially adversarial. Further, an embodiment may comprise a method of gaussian weighting to highlight suspicious, that is, low probability, words occurring near the beginning or the end of a sentence, and a way to derive a suspicion score for each word, and for the total sentence.

Thus, a defense algorithm according to one example embodiment may comprise the following operations: [1] receiving an input sentence for analysis; [2] tokenize the input sentence using, for example, a pretrained MLM (masked language) model; [3] iterating, over each token of the tokenized sentence, and substituting the token with a mask token; [4] using the MLM model, performing an inferencing on the masked sentence, to obtain the respective probabilities P for each token; [5] computing $-1*\log 10(P)$, or 'suspicion level,' for each token; [6] modulating the suspicion levels with a Gaussian weight function—in an embodiment, this weight function leaves suspicion levels at the start and end of the sentence unchanged but lowers the respective suspicion levels of tokens located at or near the middle of the sentence; and, [7] outputting respective final weighted suspicion scores for each token, and determining which, and/or. how many of those suspicion scores surpass a predefined threshold. Based on this determination, a decision may then be made as to whether or not the analyzed sentence is indicative of the occurrence of an attack on the NLP model, or otherwise presents a concern.

C. General Aspects of an Example Embodiment

In light of the disclosure herein, it will be apparent that example embodiments may possess various useful features and advantages, examples of which are set forth hereafter.

For example, an embodiment may comprise a defense method against adversarial NLP attacks that does not require expensive model training. For example, an embodiment may be applied to any pretrained MLM model. Instead of creating or tunning a specific model to detect adversarial NLP attacks, an embodiment may adapt the problem to be solved with language models. In that way, the MLM model may not require training and the method of the embodiment may accordingly be computationally cheaper than if training were required.

As another example, an embodiment may comprise a method of scoring the level of suspicion for each token in a sentence, and whether that token might be part of an adversarial prompt. For example, a method according to one embodiment may not only detect if an input is an adversarial attack, but may also returns a respective suspicion level for each token in the tokenized input string. An embodiment may define a minimum threshold to mark a token as an attack, thus avoiding false positive results when the confidence is low.

As a final example, an embodiment may comprise a model agnostic defense, such that the defense may be applied regardless of the model that is assigned the particular NLP task. In particular, an embodiment may comprise an agnostic approach which is independent of the ML (machine learning) model used to perform the NLP task. Thus, an embodiment may be applied even if there is no available information about the ML model used to perform the NLP task. Rather, an embodiment may only need the input, that is, to the ML model, which may be analyzed to detect whether or not that input is an attack.

D. Detailed Discussion of an Example Embodiment

With attention now to FIG. 1, an example method according to one embodiment is denoted at 100. As shown, the example method 100, which may be implemented in, or accessed by, an analyzer, may begin with receipt 102 of input text 103, such as may be provided by a user for example. The input text 103 may comprise an input text string such as a sentence, or a portion of a sentence, for example. In an embodiment, the input text 103 may be intercepted as it is being provided to an NLP ML model and/or the input text 103 may comprise a copy of input that is being provided to an NLP ML model. In FIG. 1, the hypothetical input text (taken from Wallace) reads:

'Question: Why did the university see a drop in applicants?
'Answer: In the early 1950s, student applications declined as a result of increasing crime and poverty in the Hyde Park neighborhood. In response, the university became a . . . why how because'

After receipt 102 of the input text, a tokenization operation may be performed 104 that creates tokens based on the input text. As shown, a set of these tokens may be output 106 that may include, for example, the tokens ['Question,' . . . 'why,' 'did' . . . 'became,' 'why,' 'how,' 'because.']. In one example embodiment, BERT may be used as the pretrained MLM model of choice to perform the tokenization 104. The implementation in this example may be the open-source Hugging Face BERT, with the included sub-word tokenizer.

After tokenization 104/token output 106, an inferencing process 108 may be performed using the trained MLM (Masked Language Model). An output 110 of the inferencing process 108 may be, for each token in a model vocabulary of the MLM, a probability that the particular token from the model vocabulary belongs in a given position in the input text 103. token. In an embodiment, the inferencing process 108 may comprise using the MLM model to perform masking operations. For example, the MLM model may have a separate placeholder <mask> token for masking. In an embodiment, each token obtained at 104 from the input sentence 103 may be replaced by <mask>. Taking the example hypothetical sentence "study OCTO-1234 was successfully finished" referred to earlier herein, a masking process according to one embodiment may thus produce the following:

1st iteration: <mask> octo-1234 was successfully finished.
2nd iteration: study <mask>o-1234 was successfully finished.
3rd iteration: study oct<mas>-1234 was successfully finished.
nth iteration . . .

As part of the inferencing 108, the tokenized and masked sentence may be processed by the MLM model, which may then return the probabilities for each word in the model vocabulary. That is, in an embodiment, BERT or another MLM outputs the probability of each potential word, of the model vocabulary, of filling the gap(s) defined by the <mask>.

Next, a suspicion computation operation 112 may be performed, such as based on the probabilities determined in the inferencing operation 108. In general, the suspicion computation operation 112 may comprise a procedure that calculates the extent to which each token belongs to a masked portion of the input 103. In an embodiment, the probabilities that form the basis for suspicion computations are real numbers between 0 and 1, with higher probabilities typically being in the 0.1 to 0.9 range. Lower probability words, meaning those that likely do not belong in a given mask position in a given sentence, typically have much lower probabilities, such as on the order of 10EE-06 to 10EE-08, for example. As the difference between low and high probabilities may be considerable, such as differences of 5 to 10 orders of magnitude, in powers of 10, it may be easier to use the log 10 of these values as a measure of the extent to which a word is suspect, that is, suspicious. However, the lower the probability of a word, the more negative the log 10 value of that probability will be. As such, taking −log 10 P, where P is the probability, will yield a positive number 'S' that is higher the more a word is suspect. This quantity may thus be termed as 'suspicious' or having a 'suspicion level' S.

The adversarial attack in the hypothetical illustrative case of the input text 103 involves appending tokens at the beginning or the end of the sentence. As such, unlikely words in those positions should be considered even more suspect compared to words towards the middle of the input text 103. One way to achieve this is to modulate the values of S by using a function that tends to 1 towards the extremes of a sentence (close to start and end) but decays to 0 towards the center. Thus, an embodiment may perform a Gaussian weighting procedure 114 to generate a Gaussian distribution 116 that is centered in the middle position of the sentence, such that half the number of tokens in the sentence are on one side of the center, and the other half of the tokens in the sentence are located on the other side of the center. In an embodiment, the variance of this Gaussian distribution 116 is a hyperparameter that may be manually adjusted, such as depending on whether central tokens should be considered important or not.

With continued reference to the example of FIG. 1, a thresholding operation 118 may be performed that defines a threshold 120. In general, a suspicion level 'S' above the threshold 120 may be considered as indicative of an attack, while a suspicion level 'S' below the threshold 120 may not be considered as indicative of an attack. It is noted that each application and scenario might have a different threshold for S which may, for example, be defined by an expert in the area of that application after some initial testing. For instance, one of the attacks in Wallace involves appending the prompt 'why how because,' which causes the text to generate a continuation. For instance, Wallace has the following example input sentence: 'Question: Why did the university see a drop in applicants? In the early 1950s, student applications declined as a result of increasing crime and poverty in the Hyde Park neighborhood. In response, the university became a why how because.'

Figure 2:
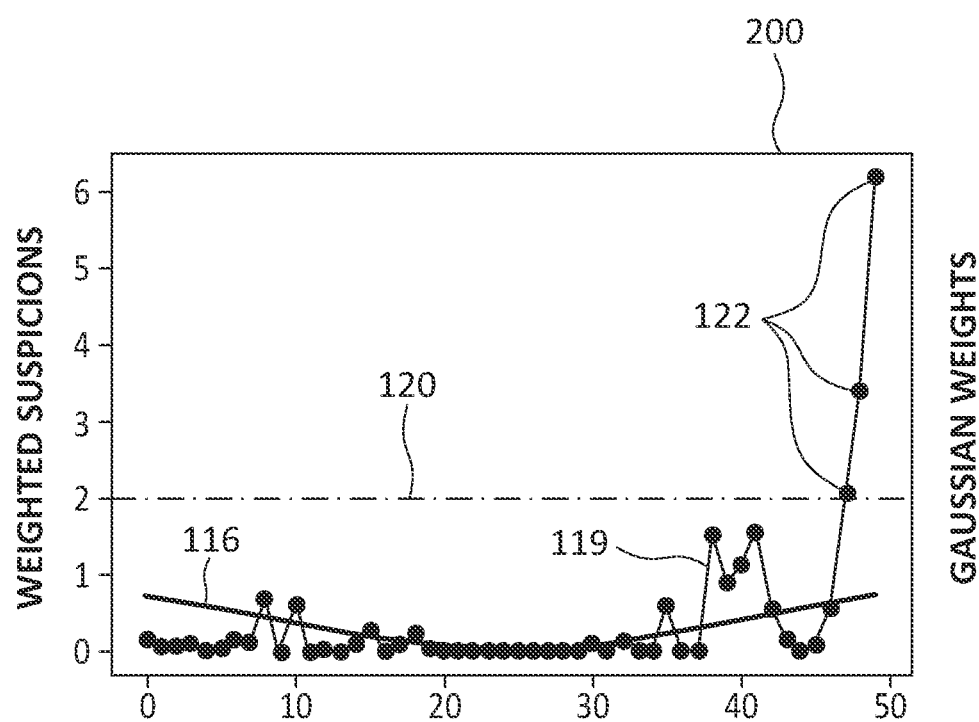
FIG. 2 discloses aspects of an output of an example embodiment.

With reference now to FIG. 2, and continued attention to FIG. 1, there are disclosed some results, in the form of a graph 200, of the operation of an example embodiment with respect to the example input text 103. In general, FIG. 2 discloses suspicion levels 'S' for the example sentence, above, taken from Wallace. Each data point in this graph refers to a token from the tokenized sentence. The curve 116 is the gaussian weighing, the curve 119 indicates the weighted suspicion values, and the line 120 indicates a threshold value that differentiates between the last three tokens 122 [why, how, because], which are the attack tokens in this example, and the rest of the tokens in the input text 103. Note that, in the graph 200, the position of the tokens 122 at the far right side of the curve 119 indicates the position of those tokens 122 at the end of the input text 103.

In more detail, and with continued reference to FIG. 2, the tokens referring to 'why how because' are the three last data entries on the curve 116, and it can be seen that those tokens have higher weighted suspicion values, as compared with the respective suspicion values of other tokens in the input text 103. By selecting an appropriate threshold 120, an embodiment may be able to separate those three tokens from the rest of the sentence. For different NLP models being attacked, or the same models being attacked on different tasks, it may be necessary to perform tests and pick different thresholds.

E. Example Methods

It is noted with respect to the disclosed methods, including the example method of FIG. 1, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

F. Further Example Embodiments

Following are some further example embodiments of the invention. These are presented only by way of example and are not intended to limit the scope of the invention in any way.

Embodiment 1. A method, comprising: receiving a text string that includes multiple words; tokenizing the text string to create a tokenized text string; substituting each token in the tokenized text string with a mask token to create a masked text string; performing an inference process on the masked text string to obtain a respective probability for each token; determining a respective suspicion level for each probability; modulating the suspicion levels to obtain a respective weighted suspicion score for each token; and comparing each of the weighted suspicion scores with a threshold to determine whether any one or more of the words indicate that the text string comprises an attack prompt.

Embodiment 2. The method as recited in any preceding embodiment, wherein the text string was transmitted to a natural language processing model.

Embodiment 3. The method as recited in any preceding embodiment, wherein the text string is tokenized using a pre-trained masked language model.

Embodiment 4. The method as recited in any preceding embodiment, wherein the respective suspicion levels are determined using: $-1*\log 10(P)$, where 'P' is the probability.

Embodiment 5. The method as recited in any preceding embodiment, wherein the suspicion levels are modulated using a Gaussian weight function.

Embodiment 6. The method as recited in any preceding embodiment, wherein the text comprises an attack prompt when a selected number of weighted suspicion scores exceed the threshold.

Embodiment 7. The method as recited in any preceding embodiment, wherein substituting each token in the tokenized text string with a mask token is performed iteratively over the tokens.

Embodiment 8. The method as recited in any preceding embodiment, wherein the weighted suspicion scores are obtained without reference to a type of natural language processing model to which the text string is input.

Embodiment 9. The method as recited in any preceding embodiment, wherein the threshold is a minimum threshold that is set to avoid false positives when the respective probability of one or more of the tokens is below the threshold.

Embodiment 10. The method as recited in any preceding embodiment, wherein the text string is tokenized using a pre-trained masked language model that does not require any additional training to facilitate detection of an attack in the text string.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
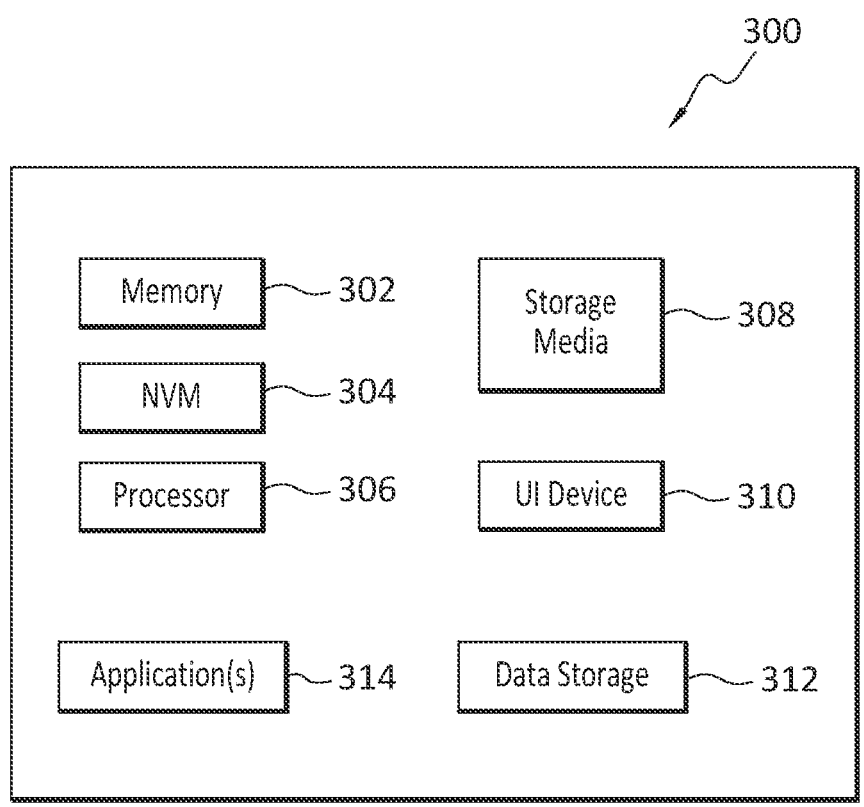
FIG. 3 discloses aspects of a computing entity configured and operable to perform any of the disclosed methods, processes, and operations.

With reference briefly now to FIG. 3, any one or more of the entities disclosed, or implied, by FIGS. 1-2, and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 3.

In the example of FIG. 3, the physical computing device 300 includes a memory 302 which may include one, some, or all, of random access memory (RAM), non-volatile memory (NVM) 304 such as NVRAM for example, read-only memory (ROM), and persistent memory, one or more hardware processors 306, non-transitory storage media 308, UI device 310, and data storage 312. One or more of the memory components 302 of the physical computing device 300 may take the form of solid state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for detecting attacks on a NLP (natural language processing) model, comprising:
performing, in a NLP (natural language processing) model that has received an input text string that includes multiple words, a defense against one or more attacks on the NLP model, where performing the defense includes:
tokenizing, by a pretrained MLM (masked language model), the text string to create a tokenized text string;
substituting each token in the tokenized text string with a mask token to create a masked text string;
performing, by the pretrained MLM, an inferencing process on the masked text string to obtain a respective probability for each token;
determining a respective suspicion level for each probability;

modulating the suspicion levels to obtain a respective weighted suspicion score for each token, wherein a weight function is used to obtain the respected weighted suspicion scores, and the weight function leaves suspicion levels at a start and end of the input text string unchanged but lowers the respective suspicion levels of tokens located at or near a middle of the input text string;

comparing each of the weighted suspicion scores with a threshold to determine whether any one or more of the words indicate that the text string comprises an attack prompt directed at the NLP;

identifying the text string as an attack prompt when a selected number of weighted suspicion scores are determined to exceed the threshold; and ignoring the attack prompt so that no responsive output to the attack prompt is generated by the NLP model.

2. The method as recited in claim 1, wherein the attack prompt comprises a universal attack.

3. The method as recited in claim 1, wherein the respective suspicion levels are determined using: $-1*\log 10(P)$, where 'P' is the probability.

4. The method as recited in claim 1, wherein the probability for a given one of the tokens is a probability that a word associated with the given token belongs in a given position in the input text string.

5. The method as recited in claim 1, wherein a nature of the attack prompt that was identified is such that an output generated by the NLP model in response to the input text string would, absent performance of the defense, manifest an effect of the attack prompt in a way imperceptible by a human.

6. The method as recited in claim 1, wherein substituting each token in the tokenized text string with a mask token is performed iteratively over the tokens.

7. The method as recited in claim 1, wherein the weighted suspicion scores are obtained without reference to a type of the NLP.

8. The method as recited in claim 1, wherein the threshold is a minimum threshold that is set to avoid false positives when the respective probability of one or more of the tokens is below the threshold.

9. The method as recited in claim 1, wherein the text string is tokenized using a pre-trained masked language model that does not require any additional training to facilitate detection of an attack prompt in the text string.

10. A non-transitory storage medium having stored therein instructions that are executable by one or more hardware processors to perform a method for detecting attacks on a NLP (natural language processing) model, comprising:

performing, in a NLP (natural language processing) model that has received an input text string that includes multiple words, a defense against one or more attacks on the NLP model, where performing the defense includes:

tokenizing, by a pretrained MLM (masked language model), the text string to create a tokenized text string;

substituting each token in the tokenized text string with a mask token to create a masked text string;

performing, by the pretrained MLM, an inferencing process on the masked text string to obtain a respective probability for each token;

determining a respective suspicion level for each probability;

modulating the suspicion levels to obtain a respective weighted suspicion score for each token, wherein a weight function is used to obtain the respected weighted suspicion scores, and the weight function leaves suspicion levels at a start and end of the input text string unchanged but lowers the respective suspicion levels of tokens located at or near a middle of the input text string;

comparing each of the weighted suspicion scores with a threshold to determine whether any one or more of the words indicate that the text string comprises an attack prompt directed at the NLP;

identifying the text string as an attack prompt when a selected number of weighted suspicion scores are determined to exceed the threshold; and ignoring the attack prompt so that no responsive output to the attack prompt is generated by the NLP model.

11. The non-transitory storage medium as recited in claim 10, wherein the attack prompt comprises a universal attack.

12. The non-transitory storage medium as recited in claim 10, wherein the respective suspicion levels are determined using: $-1*\log 10(P)$, where 'P' is the probability.

13. The non-transitory storage medium as recited in claim 10, wherein the probability for a given one of the tokens is a probability that a word associated with the given token belongs in a given position in the input text string.

14. The non-transitory storage medium as recited in claim 10, wherein a nature of the attack prompt that was identified is such that an output generated by the NLP model in response to the input text string would, absent performance of the defense, manifest an effect of the attack prompt in a way imperceptible by a human.

15. The non-transitory storage medium as recited in claim 10, wherein substituting each token in the tokenized text string with a mask token is performed iteratively over the tokens.

16. The non-transitory storage medium as recited in claim 10, wherein the weighted suspicion scores are obtained without reference to a type of the NLP.

17. The non-transitory storage medium as recited in claim 10, wherein the threshold is a minimum threshold that is set to avoid false positives when the respective probability of one or more of the tokens is below the threshold.

18. The non-transitory storage medium as recited in claim 10, wherein the text string is tokenized using a pre-trained masked language model that does not require any additional training to facilitate detection of an attack prompt in the text string.

* * * * *